United States Patent [19]

Mohrsen

[11] 4,242,023

[45] Dec. 30, 1980

[54] SHEET POSITIONER

[75] Inventor: Leif Mohrsen, Surrey, Canada

[73] Assignee: Durad Machine Company, Ltd., New Westminster, Canada

[21] Appl. No.: 30,317

[22] Filed: Apr. 16, 1979

[51] Int. Cl.[3] .............................................. B65G 65/02

[52] U.S. Cl. ...................................... 414/36; 414/113; 414/222; 414/267; 100/196

[58] Field of Search .................. 414/28, 36, 113, 222, 414/267, 786; 100/196; 144/245 R, 245 E

[56] References Cited

U.S. PATENT DOCUMENTS

| | | | |
|---|---|---|---|
| Re. 27223 | 11/1971 | Nelson | 100/196 X |
| 2,602,554 | 7/1952 | Griffith | 414/36 X |
| 2,704,608 | 3/1955 | Graf et al. | 414/222 |
| 2,728,468 | 12/1955 | Siempelkamp | 100/196 |
| 2,892,213 | 6/1959 | McCormack | 414/28 X |
| 3,339,757 | 9/1967 | Nagaoka | 414/222 |
| 3,435,966 | 4/1969 | Jinno | 414/267 |
| 3,799,366 | 3/1974 | Omelchok | 414/786 X |

*Primary Examiner*—Stephen G. Kunin
*Assistant Examiner*—Terrance L. Siemens
*Attorney, Agent, or Firm*—Fulwider, Patton, Rieber, Lee & Utecht

[57] ABSTRACT

An apparatus for loading panels into a hot press comprises a frame for locating near the openings of the press. A tray carriage mounted on the frame comprises a plurality of vertically spaced-apart horizontal trays for receiving the panels. The trays are movable into and out of the press with reciprocation of the tray carriage towards and away from the press. There is an alignment mechanism for vertically aligning front and back edges of the panels before they are loaded into the press. The alignment mechanism is mounted within the frame for movement towards and away from the press when the tray carriage is stationary. The alignment mechanism is engageable with the edges of the panels so the alignment mechanism moves the panels along the trays to vertically align the front and back edges.

19 Claims, 3 Drawing Figures

SHEET POSITIONER

BACKGROUND OF THE INVENTION

This invention relates to an apparatus for loading panels into a hot press.

Canadian Pat. No. 969,124 and the corresponding U.S. Pat. No. 3,799,366 to Omelchuk disclose a hot press loader which offers significant advantages over the prior art. The panels are loaded into the press by a carriage comprising a plurality of vertically spaced-apart horizontal trays. Before the panels are loaded into the press, it is necessary to square or vertically align the front and back edges of the panels. For this purpose, the Omelchuk invention employs a pair of vertical squaring bars, also referred to as first stop means. In order to align the panels, the carriage is moved part way into the press and the vertical squaring bars are moved inwardly towards the sides of the trays. The carriage is then moved away from the press so the panels engage the squaring bars. This squares and aligns the outer edges of the panels. The carriage can then be moved towards the press and the panels loaded into the press.

The alignment means employed by Omelchuk requires four movements of the carriage each time the press is loaded with panels. Moreover, since the panels enter the press during the alignment operation, the panels can only be aligned when the press is empty. As a consequence, the alignment operation cannot be carried on simultaneously with the pressing operation.

SUMMARY OF THE INVENTION

According to the invention, an apparatus for loading panels into a hot press has a plurality of vertically spaced-apart openings for receiving the panels. The apparatus comprises a frame for locating near the openings of the press. A tray carriage is mounted on the frame for horizontal reciprocation towards and away from the press. The tray carriage comprises a plurality of vertically spaced-apart horizontal trays for receiving the panels to be loaded into the press. Each tray has two sides, is aligned with one of the openings of the press and is movable into and out of the press with the reciprocation of the tray carriage. There is alignment means for vertically aligning front and back edges of the panels, and squaring the panels, before the panels are loaded into the press. The alignment means is mounted on the frame for movement towards and away from the press when the tray carriage is stationary and is engagable with one of the edges of the panels so the alignment means moves the panels along the trays to vertically align the edges thereof.

The alignment means may comprise a pair of vertical straight edges, each straight edge engaging the panels near one side of the trays.

The straight edges may be movable towards the sides of the trays to engage with the panels and movable away from the sides of the trays to disengage from the panels.

Each straight edge may be near a distal end of a pivotable arm, each pivotable arm being pivotally mounted near a proximal end.

Each of the arms may be mounted on an alignment carriage mounted within the frame, each alignment carriage being near one side of the trays.

Preferably, the tray carriage has a top and a bottom, the straight edges extending from near the top to near the bottom of the tray carriage. The alignment means comprises a spaced-apart pair of arms for each alignment carriage, one said arm for each alignment carriage being near the top of the tray carriage and one said arm for each alignment carriage being near the bottom of the tray carriage.

In a preferred form where the tray carriage has a back adjacent the press and a front distal the press, the proximal ends of the arms are near the back of the tray carriage and the distal ends of the arms are near the front of the tray carriage. The arms are pivotable between an outer position where the straight edges are outwardly spaced-apart from the sides of the trays to an inner position where the straight edges are near the sides of the trays.

When compared with the prior art mechanism for aligning panels to be loaded into a hot press, the present invention offers significant advantages. The alignment of the panels prior to being loaded into the press can be accomplished by moving the alignment means, the alignment carriages according to the preferred form of the invention, which are considerably lighter in weight and smaller than the tray carriage which had to be moved to align the panels in the prior art device. Accordingly, the alignment means can be moved more quickly and more easily than the tray carriage. In the prior art hot press loader, the panels had to be moved twice during the alignment process, once towards the press and once away from the press. By comparison, the alignment means of the present invention requires only a single movement of the panels in one direction along the trays. Since the panels and trays do not enter the press during the alignment process, the panels can be aligned at the same time the previous set of panels is being pressed in the press. The alignment process is thereby speeded up, saving 7 to 8 seconds for each set of panels. This adds considerably to the productivity of the hot press loader.

In drawings which illustrate embodiments of the invention:

DESCRIPTION OF THE PREFERRED EMBODIMENTS

Figure 1:
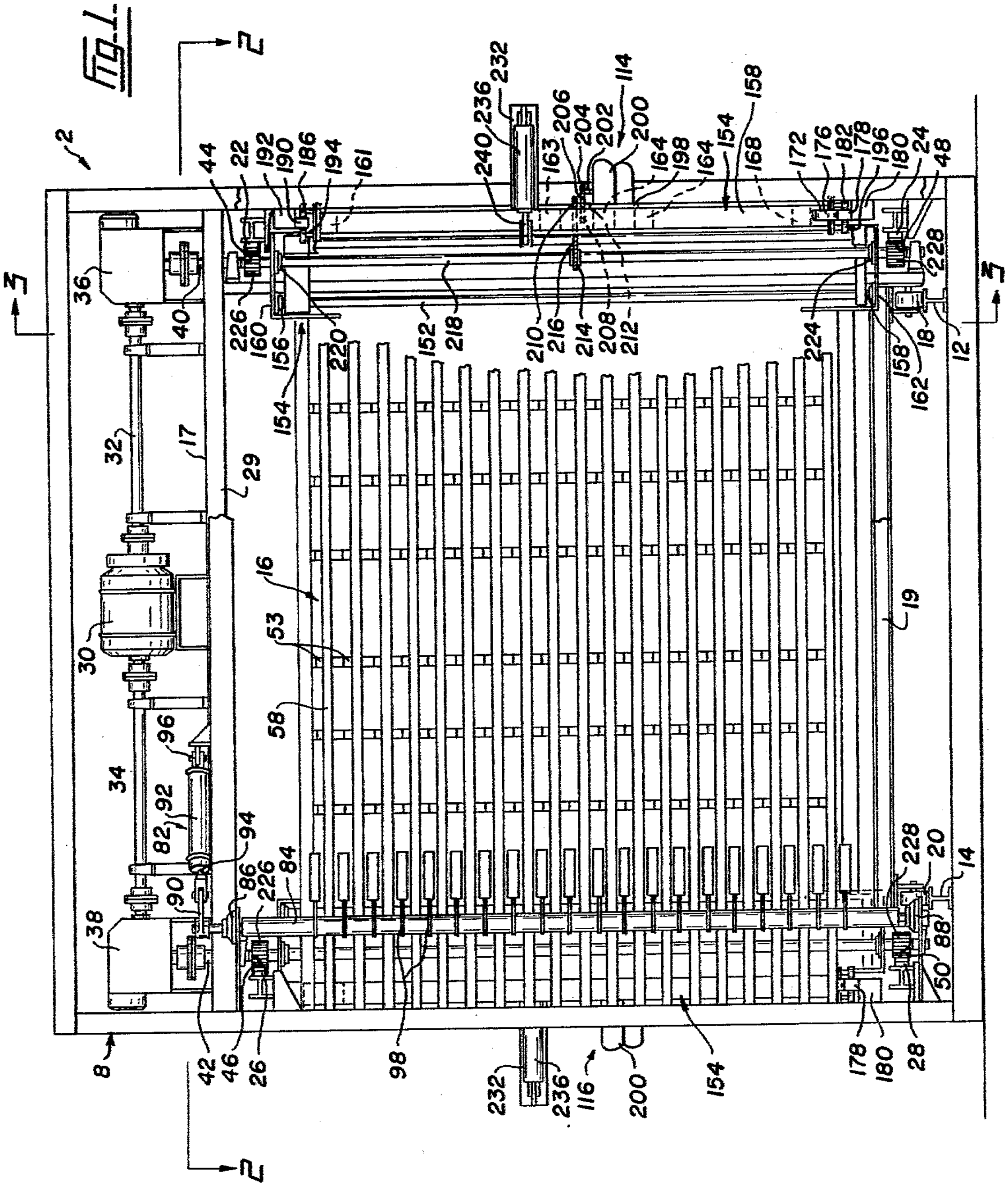
FIG. 1 is a rear elevational view of an apparatus for loading panels and an alignment means for vertically aligning the front and back edges of the panels according to an embodiment of the invention, the front right corner of the apparatus being broken away.
Figure 2:
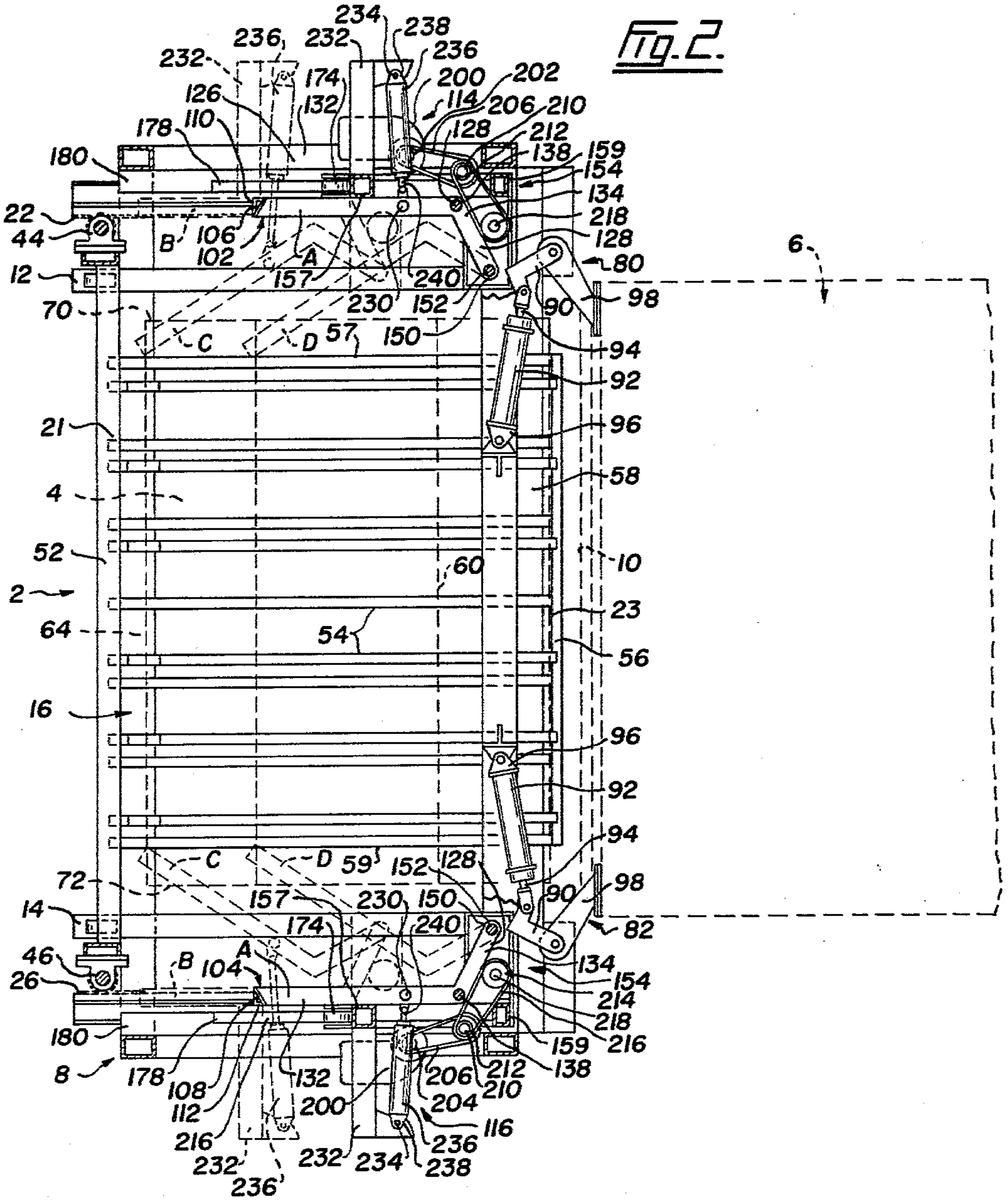
FIG. 2 is a sectional plan view of the apparatus taken along line 2—2 of FIG. 1.
Figure 3:
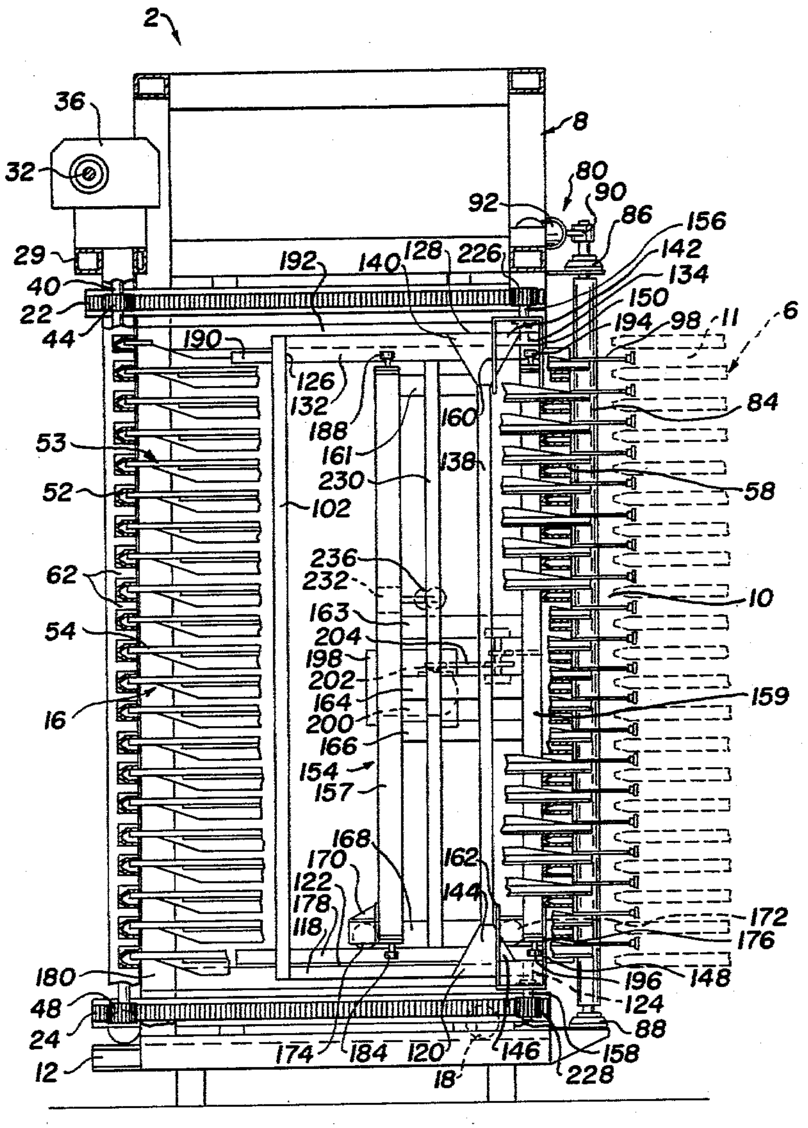
FIG. 3 is a sectional view of the apparatus taken along line 3—3 of FIG. 1.

The apparatus for loading panels into the hot press as shown in FIGS. 1 to 3 is generally similar to the hot press loader apparatus disclosed in Canadian Pat. No. 969,124 and U.S. Pat. No. 3,799,366 except for the alignment means for vertically aligning the front and back edges of the panels and squaring the panels before they are loaded into the press.

Referring to the drawings, the apparatus 2 is designed to load panels 4 into a hot press 6. The panels and hot press are indicated in outline by broken lines in FIG. 2. Although not necessarily so restricted, the panels 4 may be plywood veneers which are consolidated into sheets of plywood in the press 6.

The apparatus 2 has a frame 8 for locating in front of the front 10 of the press 6 which has a plurality of vertically spaced-apart openings 11, as seen in FIG. 3, for receiving the panels 4. A pair of spaced-apart rails 12 and 14 are mounted on the frame 8 near the bottom thereof and extend horizontally from near the front 10 of the press 6.

The apparatus 2 is equipped with a tray carriage 16 with a top 17, a bottom 19, a front 21 and a back 23. The tray carriage is equipped with two spaced-apart pairs of wheels 18 and 20 rotatably mounted thereon. The pairs of wheels 18 and 20 rest upon rails 12 and 14 respectively for horizontal reciprocation of the tray carriage 16 towards and away from the press 6. A pair of spaced-apart racks 24 and 28 are mounted on the frame 8 near the bottom thereof adjacent the rails 12 and 14. A second pair of spaced-apart racks 22 and 26 are connected to the frame 8 near the top thereof above racks 24 and 28 respectively. A platform 29 extends laterally across the top of carriage 16. An electric motor 30 is mounted on platform 29 and a pair of drive shafts 32 and 34 connect the motor 30 to gear boxes 36 and 38 respectively. Drive shafts 40 and 42 extend downwardly from gear boxes 36 and 38 respectively to near the bottom of frame 8. Pinions 44 and 46 are connected to drive shafts 40 and 42 near the tops thereof to engage racks 22 and 26 respectively. Similarly, pinions 48 and 50 are connected to the shafts 40 and 42 near the bottoms thereof to engage racks 24 ad 28 respectively. Motor 30, shafts 32 and 34, gear boxes 36 and 38, drive shafts 40 and 42 and pinions 44, 46, 48 and 50 provide means for powering the movement of tray carriage 16 towards and away from press 6 along rails 12 and 14.

Tray carriage 16 comprises a plurality of vertically spaced-apart nose bars 52, each of which is substantially V-shaped in cross section. From each of the nose bars 52, vertically spaced-apart horizontal tray 53 extends rearwardly towards the press 6. Each of the trays 53 comprises a plurality of laterally-spaced slats 54 extending from a nose bar 52 to near the front 10 of the press 6. The ends of the slats 54 of each tray adjacent the press 6 are connected by a horizontal bar 56. The end of each of the trays 53 adjacent press 6 is slidably supported by one of a plurality of vertically spaced-apart horizontal bars 58 connected to frame 8. Each of the trays 53 has two sides 57 and 59 and is aligned with one of the openings 11 of the press 6.

The panels 4 are loaded onto the trays 53 by inserting the back ends 60 of the panels through one of the openings 62 between the nose bars 52. The loading may be done manually or by automatic loading machinery not comprising part of the invention. The panels are then pushed rearwardly until their front edges 64 clear the nose bars 52. The front edges 64 of the panels are then near the front 21 of the tray carriage while their back edges 60 are in front of the back 23 of the tray carriage 16. The sides 70 and 72 of each of the panels 4 overlap the respective sides 57 and 59 of the trays 53.

When motor 30 rotates in one direction to move carriage 16 towards the press 6 by means of the racks 22, 24, 26 and 28 and the corresponding pinions 44, 48, 46 and 50, the trays 53 slide over the horizontal bars 58 and enter press 6 to load the panels 4 into the press.

To keep the panels 40 within the press 6 when the carriage 16 is withdrawn by reversing motor 30, the apparatus 2 is provided with stop means comprising a pair of stop mechanisms 80 and 82 mounted on the frame 8 to each side of the the front 10 of the press 6. The stop mechanisms 80 and 82 are mirror images of each other and the same numbers identify the same parts on the two mechanisms. Each mechanism has a vertical shaft 84 rotatably mounted on frame 8 by means of journal bearings 86 and 88 near the top and bottom thereof. A crank 90 is connected to the top of each shaft 84 and extends radially therefrom. A fluid cylinder 92 has a piston rod 94 pivotally connected to the crank 90 and an opposite end 96 pivotally connected to the frame 8. A plurality of vertically spaced-apart stop arms 98 are connected to the shafts 84 and extend radially therefrom. As seen in FIG. 3, there is one stop arm 98 aligned with each of the openings 11 in the press 6. Before the panels 4 are loaded into the press, the stop arms 98 are rotated away from the openings 11 by cylinders 92. After the panels are loaded into the press by moving trays 53 into the press, cylinders 92 are used to rotate arms 98 to the position in front of the press as illustrated. Motor 30 is then reversed to move carriage 16 away from the press and the stop arms 98 press against the front edges 64 of the panels to keep the panels in the press.

As described above, the apparatus 2 for loading the panels 4 into the hot press 6 is generally similar to the prior art apparatus. However, the apparatus according to an embodiment of this invention includes improved alignment means mounted on the frame 8 for vertically aligning the front edges 64 and the back edges 60 of the panels 4, and squaring the panels, before they are loaded into the press. The alignment means comprises a pair of vertical straight edges 102 and 104. Of course, other vertically aligned engagement means could be substituted for the straight edges. Straight edges 102 and 104 comprise vertically elongate flat bars 106 and 108 respectively with angle sections 110 and 112 welded along the lengths thereof to form triangular sections and provide rigidity. Straight edges 102 and 104 extend from near the top 17 of the tray carriage 16 to near the bottom 19.

Mechanisms 114 and 116 are provided to move straight edges 102 and 104 respectively towards and away from the sides 57 and 59 respectively of the trays 53 and for moving the straight edges towards and away from the press 6. Since the mechanisms are mirror images of each other, the same numbers are used to designate the same parts on both mechanisms. The bottoms of straight edges 102 and 104 are welded to the distal ends 118 of the pivotable arms 120. Each arm 120 comprises a forward portion 122 and a rearward portion 124. The arms 120 are near the bottom 19 of the tray carriage 16 and the distal ends are near the front 21 of the carriage. The forward portions 122 extend parallel to the sides 57 and 59 of the trays 53 and are spaced-apart therefrom when the arms 120 are pivoted away from the sides of the trays as shown in FIG. 1 in solid lines. Rearward portions 124 extend towards the sides of the trays at an obtuse angle with the forward portions. Similarly, the distal ends 126 of the pivotable arms 128 are welded to the straight edges 102 and 104 adjacent the front 21 of the tray carriage 16. The arms 128 are near top 17 of the tray carriage and have forward portions 132 and rearward portions 134 parallel to the forward and rearward portions 122 and 124 of the arms 120. Each mechanism 114 and 116 has a tubular brace 138 extending vertically between the arms 128 and 120. The top end of each brace 138 is welded to one arm 128 at the junction of the forward and rearward portions 132 and 134. The bottoms of braces 138 are welded to one of the arms 120 where portions 122 and 124 are connected. A gusset plate 140 is welded to each brace 138 near the top thereof and to each pivotable arm 128.

A similar gusset plate 144 is welded to the bottom of each brace 138 and to each pivotable arm 120. Arms 120 and 128, tubular braces 138, gusset plates 140 and 144, together with the respective straight edges 102 and 104, provide two rigid frames.

Pivotable arms 120 and 128 have proximal ends 148 and 150 respectively near the back 23 of the tray carriage 16 which are welded to one of the vertical shafts 152. Each of the shafts 152 is rotatably connected to one of two alignment carriages 154 by means of journals 156 and 158 near the top and bottoms thereof on brackets 160 and 162 respectively. Each of the brackets is of steel plate welded to one of the vertical tubes 159 and one of the horizontal tubes 168.

Each alignment carriage 154 comprises a framework of two vertical rectangular tubes 157 and 159 and a plurality of horizontal square tubes 161, 163, 164, 166, and 168 connected therebetween. Wheel supports 170 and 172 are welded to tubes 157 and 159, each comprising a pair of spaced-apart plates with suitable bracing. A pair of steel wheels 174 and 176 are rotatably connected to the wheel supports 170 and 172 and rest upon guide rails 178. The guide rails 178 are steel bars which are square in section and are welded to the tops of square tubes 180 comprising part of frame 8. Rotatable steel cam rollers 182 and 184 are connected to the bottom of each tube 157 to each side of the wheel 174. The cam rollers 182 and 184 rest against the two sides of each guide rail 178. Each mechanism 114 and 116 has a second guide rail 190 connected to the square tube 192 of frame 8 near the top 17 of tray carriage 16. The guide rails 190 are vertically above the corresponding guide rails 178 and parallel thereto. Each tube 157 has a second pair of cam rollers 186 and 188 connected to the top thereof for resting against the sides of the guide rails 190. Each vertical tube 159 has upper and lower cam rollers 194 and 196 connected to the top and bottom thereof for resting against the inside of guide rails 190 and 178 respectively.

A vertical steel mounting plate 198 is welded to the outside of tubes 157, 164 and 166 of each carriage 154. A combination electric motor and gear head 200 with an upwardly extending shaft 202 is mounted on each plate 198. A chain sprocket 204 is connected to the motor shaft 202 and a multiple link chain 206 operatively connects the sprocket 204 to the bottom sprocket 208 of a pair of speed reducing sprockets 208 and 210 rotatably mounted on the vertical shaft 212. Sprocket 210 is connected to sprocket 214 mounted on vertical shaft 218 by means of a second drive chain 216. Each shaft 218 is rotatably mounted on brackets 160 and 162 by means of journals 220 and 224 respectively. Shaft 218 extends above and below journals 220 and 224 and a pinion or spur gear 226 is connected to the top of each shaft 218 to mesh with one of the upper racks 22 or 26 and a pinion or spur gear 228 is connected to the lower end of each shaft 218 to mesh with one of the lower racks 24 or 28. Motors and gear heads 200, the sprockets and drive chains, shafts 152, pinions 226 and 228 and the racks mounted on frame 8 provide first power means for moving the straight edges 102 and 104 towards and away from the press 6. The motor and gear head 200 of each carriage 154 is reversible to provide this reciprocation.

Each mechanism 114 and 116 is provided with a second power means for moving the straight edges 102 and 104 towards and away from the sides 57 and 59 of the trays 53. A vertical tube 230 connects the forward portions of each pair of arms 120 and 128 between the straight edges and the tubes 138. A cylinder support for each mechanism 114 and 116 comprises a square tube 232 welded to square tube 157 above the motor and gear head combination 200 and extending horizontally outwards therefrom. A bracket 234 is welded to the end of each tube 232 and a fluid cylinder 236 has an outside end 238 pivotably connected to the bracket 234. Piston rod 240 extending from the other end of cylinder 236 is pivotably connected to the vertical tube 230. By supplying pressurized fluid to cylinder 236 to extend piston rod 240, the arms 220 and 228 and the straight edges 102 and 104 can be pivoted towards the sides 57 and 59 of trays 53 as indicated in broken lines in FIG. 1.

The operation of alignment mechanisms 114 and 116 commences after the panels are loaded on the trays 53 with the mechanisms in position "A" indicated in FIG. 2. Power is supplied to the two motor and gear head combinations 200 to rotate the shafts 202 in a suitable direction to turn the shafts 218 by means of the sprockets and chains 206 and 216. Pinions 226 and 228, engaging with upper racks 22 and 26 and lower racks 24 and 28, move the two alignment carriages 154 away from position "A" adjacent the press 6 to the forward position "B" shown in broken lines in FIG. 2.

Pressurized fluid is then supplied to cylinders 236, as already described, to move the two pairs of arms 220 and 228, and the straight edges 102 and 104, to the inner position "C" near the sides 57 and 59 of trays 53, as shown in broken lines in FIG. 3.

The straight edges 102 and 104 then engage the front edges 64 of the panels 4 near the corners with sides 70 and 72. Motor and gear head combinations 200 are reversed to move the carriages 154 towards position "D" and the press 6. This causes the straight edges 102 and 104 to bear against the front edges 64 of the panels 4 to align the front edges 64 and square the panels. When the carriages 154 have returned to the original position near press 6 as shown in solid lines in FIG. 1, the panels are properly aligned. Since the panels have similar dimensions between the front edges 64 and the rear edges 68, the rear edges 68 are properly aligned at the same time.

Piston rods 240 are then retracted into cylinders 236 to return straight edges 102 and 104 to the outside position "A" spaced-apart from sides 57 and 59 of trays 53, as shown in solid lines in FIG. 2. The panels 4 can then be loaded into the press 6 by moving tray carriage 16 towards the press using the motor 30 and the drive train already described.

As described above, the alignment operation is carried out while the tray carriage 16 is stationary. Unlike the prior art, neither the panels nor the trays 53 need enter the press during the alignment operation. Consequently, a plurality of panels 4 can be vertically aligned before being loaded into the press 6 while the previous set of panels is being pressed in the press.

What I claim is:

1. An apparatus for loading panels into a hot press having a plurality of vertically spaced-apart openings for receiving the panels, the apparatus comprising:

a frame for locating near the openings of the press;

a tray carriage mounted on the frame for horizontal reciprocation towards and away from the press, the tray carriage comprising a plurlity of vertically spaced-apart horizontal trays for receiving the panels to be loaded into the press, each said tray having two sides, being aligned with one of the openings of the press and being movable into and out of the press with the reciprocation of the tray carriage; and alignment means for vertically aligning front and back edges of the panels, and squaring the panels, before the panels are loaded into the press, the alignment means being mounted on the frame for movement towards and away from the press when the tray carriage is stationary and being engageable with one of said edges of the panels so the alignment means moves the panels along the trays to vertically align the edges thereof.

2. An apparatus as claimed in claim 1, the alignment means comprising vertically aligned engagement means for engaging the one edge of each said panel.

3. An apparatus as claimed in claim 2, the engagement means comprising a pair of vertical straight edges, each said straight edge engaging the panels near one said side of the trays.

4. An apparatus as claimed in claim 3, the straight edges being movable towards the sides of the trays to engage with the panels and being movable away from the sides of the trays to disengage from the panels.

5. An apparatus as claimed in claim 4, comprising first power means for moving the straight edges towards and away from the press.

6. An apparatus as claimed in claim 5, comprising second power means for moving the straight edges towards and away from the sides of the trays.

7. An apparatus as claimed in claim 6, each said straight edge being near a distal end of a pivotable arm, each pivotable arm being pivotally mounted near a proximal end, the proximal end being opposite the distal end.

8. An apparatus as claimed in claim 7, the second power means being connected to the arms for pivoting the arms towards the sides of the trays and away from the sides of the trays.

9. An apparatus as claimed in claim 8, each of the arms being mounted on an alignment carriage mounted on the frame, each alignment carriage being near one said side of the trays, the first power means being for moving the alignment carriages towards the press and away from the press.

10. An apparatus as claimed in claim 9, comprising guide means mounted within the frame for guiding the alignment carriages towards the press and away from the press.

11. An apparatus as claimed in claim 10, the guide means comprising wheels rotatably mounted on the alignment carriages and rails mounted on the frame.

12. An apparatus as claimed in claim 11, comprising a pair of vertically spaced-apart said rails for each said alignment carriage.

13. An apparatus as claimed in claim 12, the second power means comprising a fluid cylinder connected to each said arm.

14. An apparatus as claimed in claim 12, the first power means comprising an elongate rack for each said alignment carriage mounted on the frame parallel to the sides of the trays, a motor mounted on each said alignment carriage and a spur gear connected to each said motor for engaging one said rack.

15. An apparatus as claimed in claim 10, the tray carriage having a top and a bottom, the straight edges extending from near the top to near the bottom of the tray carriage, the alignment means compriing a spaced-apart pair of said arms for each alignment carriage, one said arm for each alignment carriage being near the top of the tray carriage and one said arm for each alignment carriage being near the bottom of the tray carriage.

16. An apparatus as claimed in claim 15, the tray carriage having a back adjacent the press and a front distal the press, the proximal ends of the arms being near the back of the tray carriage and the distal ends of the arms being near the front of the tray carriage, the arms being pivotable between an outer position where the straight edges are outwardly spaced-apart from the sides of the trays to an inner position where the straight edges are near the sides of the trays.

17. An apparatus as claimed in claim 16, the straight edges being adjacent the front edges of the panels at the inner position of the arms.

18. An apparatus as claimed in claim 17, the first power means being adapted to move the alignment carriages along the rails towards the press after the pivotable arms are moved from the outside position to the inside position, so the straight edges bear against the front edges of the panels to align the front edges of the panels before the tray carriage is moved towards the press to load the panels into the press.

19. An apparatus as claimed in claim 1 or claim 18 comprising stop means mounted on the frame adjacent the openings and movable into position after the trays are moved into the press so the panels engage the stop means, and stay within the press, when the trays move away from the press.

* * * * *